(12) United States Patent
Ham et al.

(10) Patent No.: US 10,148,315 B2
(45) Date of Patent: Dec. 4, 2018

(54) METHOD AND DEVICE FOR ADJUSTING SIGNAL OF RECEIVING DEVICE IN MOBILE COMMUNICATION SYSTEM

(71) Applicant: Samsung Electronics Co., Ltd., Suwon-si, Gyeonggi-do (KR)

(72) Inventors: Jaesang Ham, Suwon-si (KR); Hyuncheol Kim, Suwon-si (KR); Yusuk Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/552,990

(22) PCT Filed: Feb. 25, 2016

(86) PCT No.: PCT/KR2016/001881
§ 371 (c)(1),
(2) Date: Aug. 23, 2017

(87) PCT Pub. No.: WO2016/137257
PCT Pub. Date: Sep. 1, 2016

(65) Prior Publication Data
US 2018/0019785 A1    Jan. 18, 2018

(30) Foreign Application Priority Data

Feb. 27, 2015  (KR) ................. 10-2015-0028547

(51) Int. Cl.
*H04B 1/71* (2011.01)
*H04B 1/7117* (2011.01)
(Continued)

(52) U.S. Cl.
CPC ........... *H04B 1/7117* (2013.01); *H04B 1/709* (2013.01); *H04B 7/0885* (2013.01); *H04B 7/0891* (2013.01); *H04B 2201/709709* (2013.01)

(58) Field of Classification Search
CPC .... H04B 1/7117; H04B 1/7115; H04B 7/216; H04B 1/709; H04B 1/7095; H04B 1/10; H04B 7/857
See application file for complete search history.

(56) References Cited

U.S. PATENT DOCUMENTS 6,522,706 B1    2/2003 Bahai et al.
2001/0017883 A1*  8/2001 Tiirola ................ H04B 1/7115
375/148

(Continued)

FOREIGN PATENT DOCUMENTS

JP         4128335 B2     7/2008
KR    10-2009-0036671 A   4/2009
(Continued)

*Primary Examiner* — Kabir A Timory
(74) *Attorney, Agent, or Firm* — Jefferson IP Law, LLP

(57) ABSTRACT

The present invention relates to a method and a device for adjusting a signal of a receiving device in a mobile communication system and, more specifically, to a method for adjusting a signal of a receiving device in a mobile communication system, the method comprising the steps of: receiving signals from at least two antennas; calculating at least one correlation value by using the received signals; obtaining a delay difference value between the signals based on the at least one calculated correlation value; and outputting adjusted signals generated by adjusting the received signals based on the obtained delay difference value.

6 Claims, 5 Drawing Sheets

(51) Int. Cl.
*H04B 1/709* (2011.01)
*H04B 7/08* (2006.01)

(56) References Cited

U.S. PATENT DOCUMENTS

| | | | |
|---|---|---|---|
| 2003/0186725 A1* | 10/2003 | Miya | H01Q 3/267 |
| | | | 455/561 |
| 2004/0114695 A1 | 6/2004 | Astely et al. | |
| 2007/0281649 A1* | 12/2007 | Maeda | H04B 1/7075 |
| | | | 455/214 |
| 2009/0096499 A1 | 4/2009 | Kim | |
| 2013/0083780 A1 | 4/2013 | Luo et al. | |
| 2013/0308542 A1 | 11/2013 | Kang et al. | |

FOREIGN PATENT DOCUMENTS

| | | |
|---|---|---|
| KR | 10-1466009 B1 | 12/2014 |
| WO | 2012/102483 A1 | 8/2012 |

* cited by examiner

METHOD AND DEVICE FOR ADJUSTING SIGNAL OF RECEIVING DEVICE IN MOBILE COMMUNICATION SYSTEM

TECHNICAL FIELD

The present invention relates to a method and a device for adjusting a signal of a receiving device in a mobile communication system, and more particularly, to a method and a device for adjusting a received signal in order to use the signal received from a receiving device using multiple reception antennas.

BACKGROUND ART

A single-input multiple-output (SIMO) system is a wireless communication technology in which a transmitting side uses one antenna and a receiving side uses several antennas. In this technology, a method in which a receiving side uses a signal having the best characteristic among several signals that are transmitted in the SIMO system is called a diversity system. In the diversity system, as a representative, a maximum ratio combining (MRC) method, which combines respective received signals with proper weight values given thereto, has been used.

However, in the case of using the MRC method, the received signals are combined under the assumption that noise or interference that is estimated on the receiving side is accurate. However, in an actual mobile communication system, there has been a need for a technology that considers the noise, interference, and delay offset between the signals received from the several antennas.

DISCLOSURE OF INVENTION

Technical Problem

The present invention has been made in order to solve the above problems, and an aspect of the present invention proposes a method and a device for adjusting a signal of a receiving device in a mobile communication system, which calculate a correlation value between signals received from multiple antennas, and adjust the received signals using a delay offset value acquired based on the calculated correlation value.

Solution to Problem

In one aspect of the present invention, a method for adjusting a signal of a receiving device in a mobile communication system includes receiving signals from at least two antennas; calculating at least one correlation value using the received signals; acquiring a delay offset value between the signals based on the at least one calculated correlation value; and outputting adjusted signals generated by adjusting the received signals based on the acquired delay offset value.

In another aspect of the present invention, a receiving device for adjusting a signal in a mobile communication system includes a controller configured to receive signals from at least two antennas, to calculate at least one correlation value using the received signals, to acquire a delay offset value between the signals based on the at least one calculated correlation value, and to output adjusted signals generated by adjusting the received signals based on the acquired delay offset value.

Advantageous Effects of Invention

In accordance with the method and the device according to the aspects of the present invention, the path delay offsets between the respective reception antennas are calculated and corrected, and thus the IRC performance gain is secured in a CDMA system.

MODE FOR THE INVENTION

Figure 1:
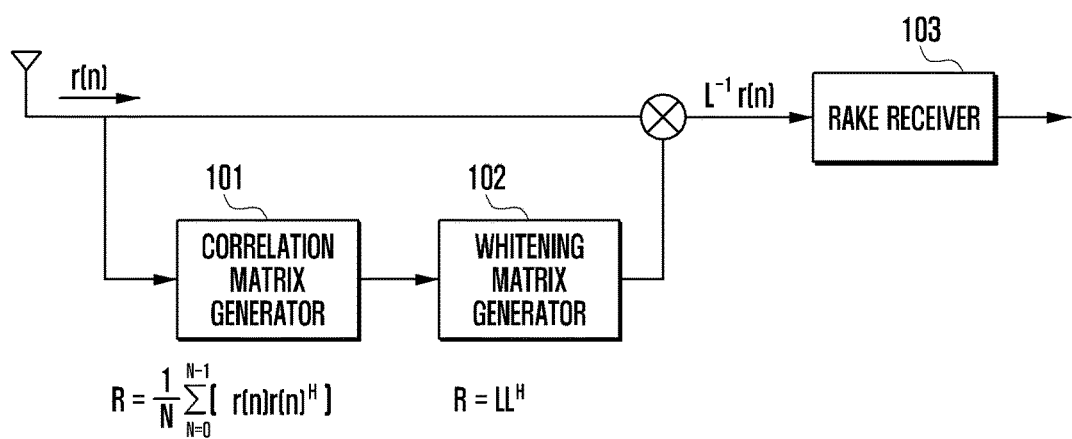
FIG. 1 is a diagram illustrating the configuration of a receiving device that performs interference rejection combining (IRC)

Hereinafter, preferred embodiments of the present disclosure will be described in detail with reference to the accompanying drawings.

In explaining embodiments of the present disclosure, explanation of technical contents which are well known in the art to which the present disclosure pertains and are not directly related to the present invention will be omitted. This is to transfer the subject matter of the present invention more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more CPUs in a device or a security multimedia card.

FIG. 1 is a diagram illustrating the configuration of a receiving device that performs interference rejection combining (IRC).

More specifically, a receiving device of FIG. 1 may include an antenna device, a correlation matrix generator 101, a whitening matrix generator 102, and a rake receiver 103.

In code division multiple access (CDMA) receiving signals, an interference rejection combining (IRC) method applied in an uplink of the received signals can minimize the influence exerted between the received signals through reflection of correlation between antennas of the received signals as described above. Accordingly, as compared with a case where only a maximum ratio combining (MRC) method that is used in a rake receiver in the related art is applied, the IRC method can maximize a signal to interference and noise ratio (SINR) of the received signals. As the influence of the interference signal becomes higher, the performance gain of the IRC against the MRC may become higher.

A method for implementing the IRC is as follows. The correlation matrix generator 101 generates a correlation matrix from the signals received from a plurality of reception antennas. The generated correlation matrix is expressed in mathematical expression 1.

[Mathematical expression 1]
$$R = \frac{1}{N}\sum_{n=0}^{N-1} r(n)r(n)^H =$$
$$\begin{bmatrix} \frac{1}{N}\sum_{n=0}^{N-1} |r_i(n)|^2 & \frac{1}{N}\sum_{n=0}^{N-1} r_i(n)r_j(n)^* \\ \frac{1}{N}\sum_{n=0}^{N-1} r_i(n)r_j(n)^* & \frac{1}{N}\sum_{n=0}^{N-1} |r_j(n)|^2 \end{bmatrix}$$

Here, R denotes a correlation matrix, and r(n) denotes a matrix of received signals. That is, if signals received from a plurality of antennas are, for example, $r_i(n)$, $r_j(n)$, the matrix of received signals becomes $$r(n) = \begin{bmatrix} r_i(n) \\ r_j(n) \end{bmatrix}.$$

$r(n)^H$ denotes a complex-conjugate matrix of r(n). Further, N means a sufficiently large sample number for accumulating correlation values of the received signals in order to obtain the correlation matrix.

Thereafter, the whitening matrix generator 102 generates a lower triangular matrix through performing of Cholesky decomposition with respect to the IRC generated correlation matrix. The generated lower triangular matrix is used as a whitening matrix. The Cholesky decomposition is used to decompose a Hermitian matrix or a positive-definite matrix, and the result of the Cholesky decomposition is expressed as multiplication of the lower triangular matrix and the complex-conjugate matrix of the lower triangular matrix as expressed in mathematical expression 2 below.

$$R = LL^H \qquad \text{[Mathematical expression 2]}$$

If the generated correlation matrix R is a Hermitian matrix or a positive-definite matrix, L denotes the lower triangular matrix, and LH denotes a complex-conjugate matrix of the lower triangular matrix.

Thereafter, the whitening matrix generator 102 uses the lower triangular matrix L as the whitening matrix, and applies the lower triangular matrix to the received signal in the unit of a chip to transform the received signal. That is, the received signal r(n) may be transformed by multiplying the received signal r(n) by an inverse matrix $L^{-1}$ of the lower triangular matrix L. Thereafter, the transformed received signal is transmitted to the rake receiver for applying the MRC to the transformed received signal.

Since the IRC technology uses the lower triangular matrix that is derived through the Cholesky decomposition of the correlation matrix of the received signal as the whitening matrix, an inter-antenna correlation derivation process plays an important role for reception performance. A delay offset may occur between the received signals of the respective antennas due to hardware delay of the respective reception antennas, and in this case, if the IRC is applied through derivation of the inter-antenna correlation value without considering this, it is not possible to obtain a better IRC performance gain. In order to solve the problem due to the delay offset between the received signals, an additional device may be introduced to the above-described configuration to correct the delay offset, and thus the received signals may be adjusted. This will be described with reference to FIG. 2.

Figure 2:
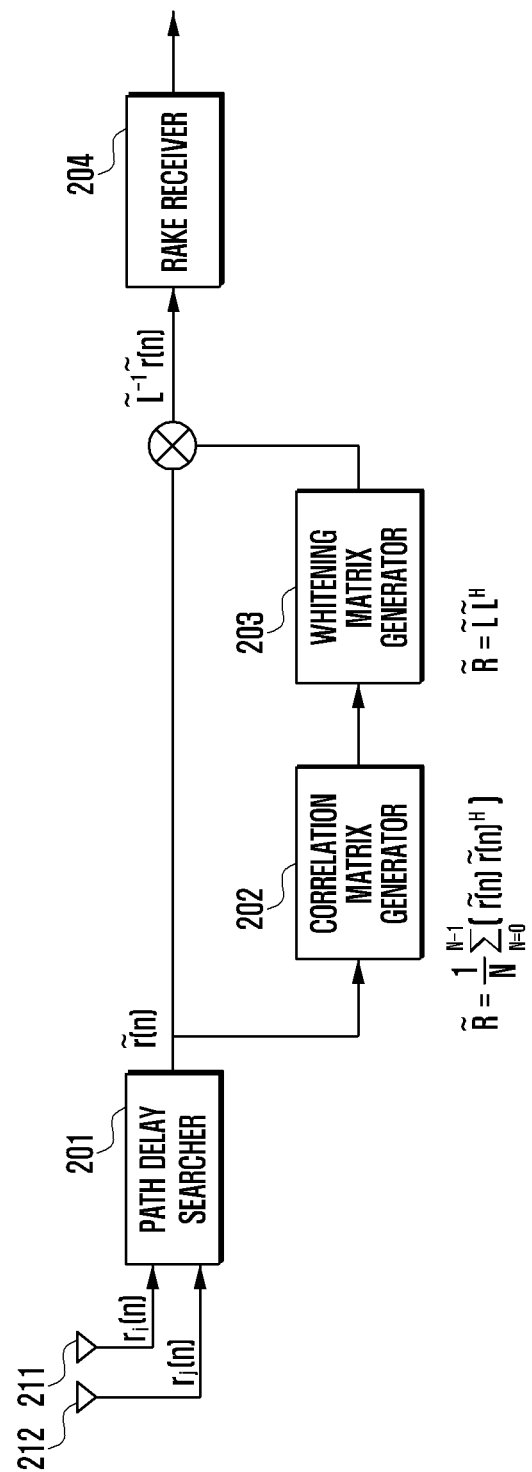
FIG. 2 is a diagram illustrating the configuration of a receiving device that performs interference rejection combining (IRC) according to an embodiment of the present invention.

FIG. 2 is a diagram illustrating the configuration of a receiving device that performs interference rejection combining (IRC) according to an embodiment of the present invention.

More specifically, FIG. 2 illustrates the configuration of a receiving device in which a path delay searcher 201 is added to the configuration of FIG. 1. That is, due to the added path delay searcher 201, a process of adjusting the received signals is added.

The receiving device may receive signals from at least two multiple antennas. Although FIG. 2 exemplarily illustrates only the receiving device that receives signals through two antennas, the present invention may include all receiving devices receiving signals through two or more multiple antennas. It is assumed that among a plurality of antennas, signals having a predetermined period that are received from the i-th antenna 211 and the j-th antenna 212 are called $r_i(n)$, $r_j(n)$. The received signals are input to the path delay searcher 201, and are adjusted to $\tilde{r}_i(n)$, $\tilde{r}_j(n)$ after passing through a signal adjustment process. The IRC in FIG. 1 can be implemented in the same manner with the adjusted signals.

That is, the correlation matrix generator 202 generates a correlation matrix from the adjusted signals. The generated correlation matrix $\tilde{R}$ is as expressed in mathematical expression 3.

$$\tilde{R} = \frac{1}{N}\sum_{n=0}^{N-1} \tilde{r}(n)\tilde{r}(n)^H = \begin{bmatrix} \frac{1}{N}\sum_{n=0}^{N-1}|\tilde{r}_i(n)|^2 & \frac{1}{N}\sum_{n=0}^{N-1}\tilde{r}_i(n)\tilde{r}_j(n)^* \\ \frac{1}{N}\sum_{n=0}^{N-1}\tilde{r}_i(n)\tilde{r}_j(n)^* & \frac{1}{N}\sum_{n=0}^{N-1}|\tilde{r}_j(n)|^2 \end{bmatrix}$$

[Mathematical expression 3]

A lower triangular matrix $\tilde{L}$ generated by the correlation matrix generator 202 that performs Cholesky decomposition of the correlation matrix $\tilde{R}$ is as expressed in mathematical expression 4.

$$\tilde{R} = \tilde{L}\tilde{L}^H$$

[Mathematical expression 4]

Accordingly, the signal input to the rake receiver is $\tilde{r}(n)\tilde{L}^{-1}$ that is obtained through multiplication of the received transformed signal $\tilde{r}(n)$ and an inverse matrix of the lower triangular matrix $\tilde{L}$.

Figure 3:
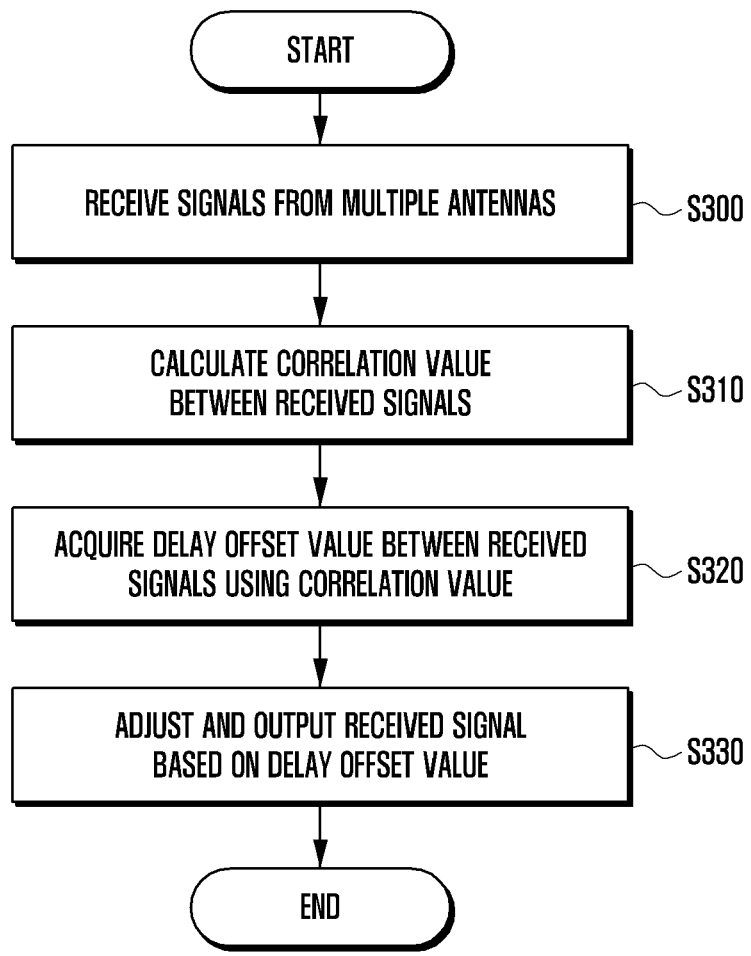
FIG. 3 is a flowchart illustrating a method for adjusting a signal in a receiving device according to an embodiment of the present invention.

FIG. 3 is a flowchart illustrating a method for adjusting a signal in a path delay searcher of a receiving device according to an embodiment of the present disclosure.

At operation S300, the path delay searcher receives signals from multiple antennas, and at operation S310, the path delay searcher calculates a correlation value between the received signals. At operation S320, the path delay searcher acquires a delay offset value between the received signals using the correlation value, and at operation S330, the path delay searcher adjusts and outputs the received signals on the basis of the delay offset value.

More specifically, at operation S300, the path delay searcher receives signals from the multiple antennas. The path delay searcher can receive signals from at least two antennas. Hereinafter, in an embodiment of the present invention, it is exemplified that signals are received from two antennas of a receiving end, but the present invention may include all receiving devices having two or more antennas.

Further, at operation S310, the path delay searcher calculates a correlation value between the received signals. Among the receiving end antennas, signals having a predetermined period that are received from the i-th and j-th antennas are called $r_i(n)$, $r_j(n)$. Hereinafter, explanation will be made on the assumption that the predetermined period is considered as a chip unit of the antennas, and the signals $r_i(n)$, $r_j(n)$ are sample signals that are decomposed in the unit of a ⅛ chip. The path delay searcher derives the correlation value between the received signals from the signals $r_i(n)$, $r_j(n)$. More specifically, a correlation value calculator of the path delay searcher may derive the correlation value between the received signals. The correlation value between the received signals is derived in a manner that a cross-correlation value $c_{i,j}(k)$ between sample values of the received signals of the respective antennas in the unit of a ½ chip is derived as expressed in mathematical expression 5 using coherent accumulation and non-coherent accumulation.

$$c_{i,j}(k) = \begin{cases} \sum_{m=0}^{M-1}\left|\sum_{n=0}^{N-1} r_i^*(4*N*m+4*n)r_j(4*N*m+4*n-k)\right|^2, & k \geq 0 \\ \sum_{m=0}^{M-1}\left|\sum_{n=0}^{N-1} r_i^*(4*N*m+4*n-|k|)r_j(4*N*m+4*n)\right|^2, & k < 0 \end{cases}$$

[Mathematical expression 5]

Here, N denotes a coherent accumulation period in the unit of a ½ chip, and M denotes a non-coherent accumulation period in which power of the coherent accumulation result is additionally accumulated. In addition to the coherent accumulation period, the non-coherent accumulation period corresponds to a necessary process to eliminate a distortion phenomenon that is caused by the phase change of the respective coherent accumulation periods.

Further, k denotes a comparison range in the unit of a ⅛ chip for comparing the correlation values. That is, through adjustment of the k value, the correlation value can be calculated on the assumption of a delay offset value between a signal received from the i-th antenna and a signal received from the j-th antenna. In mathematical expression 6, k may be expressed as follows.

$$K_{min} \leq k \leq K_{max}$$ [Mathematical expression 6]

For example, if the range of k is $-3 \leq k \leq 2$, the correlation value may be calculated on the successive assumption of a case where the signal received from the j-th antenna is delayed as much as $-\frac{3}{8}$ chip unit time in comparison to the signal received from the i-th antenna to a case where the signal received from the i-th antenna is delayed as much as ⅔ chip unit time in comparison to the signal received from the j-th antenna.

A more detailed method for obtaining the correlation value will be described later with reference to FIG. 4.

Figure 4:
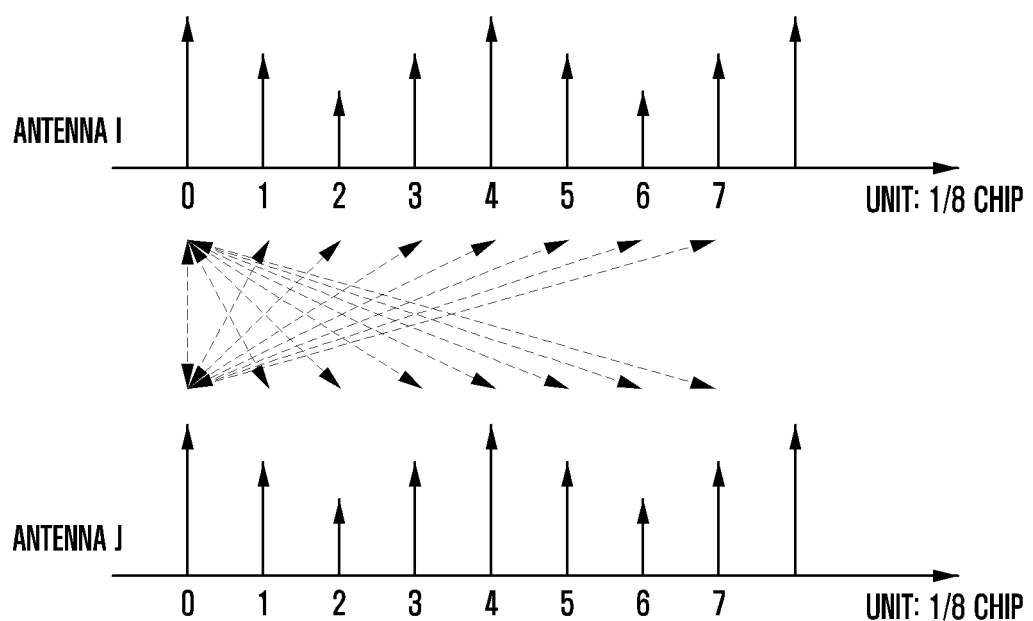
FIG. 4 is a diagram explaining obtaining of a correlation value between received signals in a receiving device according to an embodiment of the present invention.

FIG. 4 is a diagram explaining obtaining of a correlation value between received signals in a receiving device according to an embodiment of the present invention.

More specifically, FIG. 4 illustrates a signal $r_i(n)$ obtained by decomposing a signal of 1-chip period that is received from antenna i in the unit of a ⅛ chip and a signal $r_j(n)$ obtained by decomposing a signal of 1-chip period that is received from antenna j in the unit of a ⅛ chip. The horizontal axis is in the unit of a ⅛ chip, and 0 to 7 indicate unit time indexes. That is, "~unit time indexes" are indicators given to signals that are successively decomposed in time within a predetermined period after decomposition of a received signal having the predetermined period in accordance with the unit time. Hereinafter, it is exemplified to obtain correlation values in a period of $-7 \leq k \leq 7$ from the i-th antenna and the j-th antenna. In FIG. 4, 8 correlation values can be obtained from values of unit time indexes 0 to 7 of the j-th antenna on the basis of the value of the unit time index 0 of the i-th antenna. Then, 7 correlation values can be obtained from values of unit time indexes 1 to 7 of the i-th antenna on the basis of the value corresponding to the unit time index 0 of the j-th antenna. That is, through this, total 15 correlation values can be obtained in the unit of a ⅛ chip of $r_i(n)$ and $r_j(n)$ in the period of $-7 \leq k \leq 7$.

After calculating the correlation value between the received signals at operation S310 of FIG. 3, the path delay searcher acquires a delay offset value between the received signals using the correlation value at operation S320. More specifically, a delay offset value acquirer of the path delay searcher may acquire the delay offset value. Through comparison of the plurality of correlation values calculated in the unit of a ⅛ chip, the correlation value having the maximum value and the delay offset value k* at that time can be acquired as expressed in mathematical expression 7.

$$k^* = \max_k \tilde{c}_{i,j}(k)$$ [Mathematical expression 7]

The delay offset value k* is a signal obtained by decomposing the signals $r_i(n)$, $r_j(n)$ in the unit of a ⅛ chip, and may be time in the unit of a ⅛ chip. That is, if the delay offset value k* is acquired, it means that delay has occurred as much as k*/8 chip.

On the other hand, when the correlation value having the maximum value is derived through comparison of the plurality of correlation values in the unit of a ⅛ chip between the antennas in order to obtain the delay offset value k*, a comparison range period may be set. The actual comparison range can be adjusted rather than comparison of all correlated values in a fixed range. Further, a method for comparing only the correlation values of a specific location is included. This can be expressed in mathematical expression 8 below.

$$\tilde{c}_{i,j}(k) = c_{i,j}(k) * s(k), \ s(k) = 0, 1$$ [Mathematical expression 8]

If s(k) is s(k)=0, the corresponding location is excluded from the comparison range of the correlation values, and only the correlation values corresponding to s(k)=1 become the objects to be compared with. More specifically, a comparison range setter of the path delay searcher may set the range of the correlation values to be compared with. As described above, since the comparison range can be adjusted when the unit correlation values are compared with each other, overhead can be reduced when the original IRC is implemented, and thus the system performance can be improved. The set values for s(k) may be pre-stored in the IRC in the process of manufacturing the IRC or may be set later by a user.

Further, at operation S330 of FIG. 3, the path delay searcher adjusts and outputs the received signals on the basis of the delay offset value. More specifically, if the k* value is determined as a value that is different from 0, the path delay searcher determines that the delay offset value of reception time between reception antennas has occurred, and it corrects this.

If the k* value acquired using the mathematical expressions 5, 7, and 8 is larger than 0, it may mean that the received signal of the j-th antenna is delayed as much as a k*/8 chip in comparison to the received signal of the i-th antenna. In contrast, if the k* value is smaller than 0, it means that the received signal of the i-th antenna is delayed as much as a k*/8 chip in comparison to the received signal of the j-th antenna.

The path delay searcher adjusts a modem input signal as expressed in mathematical expression 9 below through correction of the determined path delay offset.

$$\tilde{r}_i(n) = r_i(n-k^*), \tilde{r}_j(n) = r_j(n) \text{ for } k^* \geq 0$$

$$\tilde{r}_i(n) = r_i(n), \tilde{r}_j(n) = r_j(n-|k^*|) \text{ for } k^* < 0$$ [Mathematical expression 9]

That is, if the k* value is equal to or larger than 0, it means that the received signal of the j-th antenna is delayed as much as a k*/8 chip in comparison to the received signal of the i-th antenna, and the received signal of the i-th antenna may be adjusted to be delayed as much as the k*/8 chip by subtracting the k* value from the unit time index n of the received signal of the i-th antenna. Further, if the k* value is smaller than 0, it means that the received signal of the i-th antenna is delayed as much as the k*/8 chip in comparison to the received signal of the j-th antenna, and the received signal of the j-th antenna may be adjusted to be delayed as much as the k*/8 chip by subtracting the k* value from the unit time index n of the received signal of the j-th antenna.

Through the above-described adjustment, even if the delay offset exists between the received signals of the reception antennas, the delay offset can be corrected using the correlation value between the received signals. After the above-described process, a modem input signal for demodulating the received signal may be adjusted. Further, the correlation matrix and the whitening matrix are derived on the basis of the corrected received signal, and thus the IRC performance gain can be improved.

Figure 5:
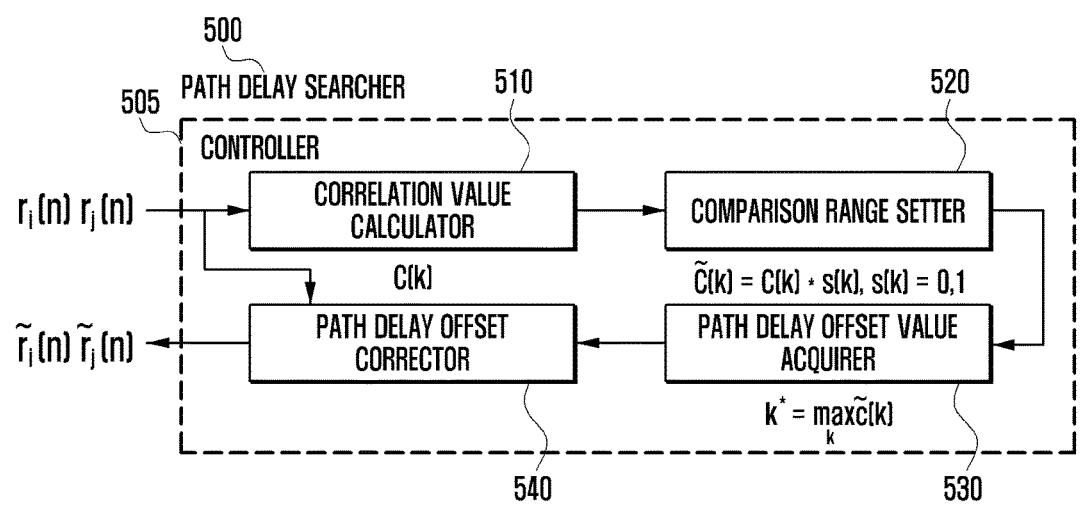
FIG. 5 is a block diagram illustrating the internal structure of a path delay searcher according to an embodiment of the present invention.

FIG. 5 is a block diagram illustrating the internal structure of a path delay searcher according to an embodiment of the present invention.

More specifically, a path delay searcher 500 may include at least two antennas and a controller 505, and the controller 505 may include a correlation value calculator 510, a comparison range setter 520, a path delay offset value acquirer 530, and a path delay offset corrector 540.

The at least two multiple antennas may transmit the received signals to the controller 505 to implement the IRC.

The controller 505 may operate to receive signals from at least two antennas, to calculate at least one correlation value using the received signals, to acquire a delay offset value between the signals on the basis of the at least one calculated correlation value, and to adjust and output the received signals on the basis of the acquired delay offset value. Further, the controller 505 may operate to extract a correlation value of at least one predetermined period among the at least one calculated correlation value, and to acquire the delay offset value on the basis of the at least one extracted correlation value.

Further, the controller 505 may operate to decompose the received signals in accordance with a predetermined unit time, and to calculate the at least one correlation value between the decomposed signals. Further, the controller 505 may operate to determine unit time indexes of the decomposed signals having a maximum value of the at least one calculated correlation value, and to acquire an offset value between the unit time indexes of the determined decomposed signals. Further, the controller 505 may operate to adjust reception time of the signals on the basis of the acquired delay offset value.

More specifically, the correlation value calculator 510 included in the controller 505 may calculate at least one correlation value using the received signals. Further, the correlation value calculator 510 may decompose the received signals in accordance with the predetermined time, and may calculate the at least one correlation value between the decomposed signals. Further, the comparison range setter 520 included in the controller 505 may set a comparison range in order to acquire the delay offset value among the at least one calculated correlation value. That is, the comparison range setter may extract the correlation values within the set comparison range.

Further, the path delay offset value acquirer 530 included in the controller 505 may acquire the delay offset value on the basis of the at least one calculated correlation value. Further, the delay offset value acquirer 530 may determine the decomposed signals having the maximum value among the at least one calculated correlation value, and may include the delay offset value between the determined decomposed signals. Further, the path delay offset corrector 540 included in the controller 505 may operate to adjust the received signals on the basis of the acquired delay offset value, and may adjust the reception time of the signals on the basis of the acquired delay offset value.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A method for adjusting a signal of a receiving device in a mobile communication system comprising:
receiving a first signal and a second signal from at least two antennas, wherein the first signal is received from a first antenna of the at least two antennas and the second signal is received from a second antenna of the at least two antennas;
decomposing the first signal into a plurality of first signal components and the second signal into a plurality of second signal components based on a predetermined unit time;
calculating a plurality of correlation values between each of the first signal components and each of the second signal components;
determining unit time indexes of a first signal component and a second signal component having a maximum value of the plurality of calculated correlation values;
acquiring a delay offset value between the unit time indexes of the first signal component and the second signal component;
outputting adjusted signals generated by adjusting the received first signal and the received second signal based on the acquired delay offset value; and
performing an interference rejection combining (IRC) operation for the received first signal and the received second signal, based on the adjusted signals to mitigate interference between the received first signal and the received second signal.

2. The method of claim 1, wherein acquiring the delay offset value comprises:
extracting a correlation value of at least one predetermined period among the plurality of calculated correlation values; and
acquiring the delay offset value based on the extracted correlation value of the at least one predetermined period.

3. The method of claim 1, wherein the adjusted signals are generated by adjusting reception time of the received first signal and the received second signal based on the acquired delay offset value.

4. A receiving device for adjusting a signal in a mobile communication system comprising:
a controller configured to:
receive a first signal and a second signal from at least two antennas, wherein the first signal is received from a first antenna of the at least two antennas and the second signal is received from a second antenna of the at least two antennas,
decompose the first signal into a plurality of first signal components and the second signal into a plurality of second signal components based on a predetermined unit time,
calculate a plurality of correlation values between each of the first signal components and each of the second signal components,
determine unit time indexes of a first signal component and a second signal component having a maximum value of the plurality of calculated correlation values,
acquire a delay offset value between the unit time indexes of the first signal component and the second signal component,
output adjusted signals generated by adjusting the received first signal and the received second signal based on the acquired delay offset value, and
perform interference rejection combining (IRC) operation for the received first signal and the received second signal, based on the adjusted signals to mitigate interference between the received first signal and the received second signal.

5. The receiving device of claim 4, wherein the controller is further configured to:
 extract a correlation value of at least one predetermined period among the plurality of calculated correlation values, and
 acquire the delay offset value based on the extracted correlation value of the at least one predetermined period.

6. The receiving device of claim 4, wherein the controller is further configured to generate the adjusted received first signal and the received second signal by adjusting reception time of the received signals based on the acquired delay offset value.

* * * * *